United States Patent
Yatsugi et al.

(10) Patent No.: US 11,434,157 B2
(45) Date of Patent: Sep. 6, 2022

(54) OPERATING METHOD FOR ORGANIC WASTEWATER TREATMENT APPARATUS AND ORGANIC WASTEWATER TREATMENT APPARATUS

(71) Applicant: Kubota Corporation, Osaka (JP)

(72) Inventors: Soichiro Yatsugi, Hyogo (JP); Shinya Nagae, Hyogo (JP); Hitoshi Yanase, Hyogo (JP); Ryosuke Ono, Hyogo (JP)

(73) Assignee: KUBOTA CORPORATION, Osaka (JP)

( * ) Notice: Subject to any disclaimer, the term of this patent is extended or adjusted under 35 U.S.C. 154(b) by 11 days.

(21) Appl. No.: 17/208,859

(22) Filed: Mar. 22, 2021

(65) Prior Publication Data
US 2021/0206676 A1    Jul. 8, 2021

Related U.S. Application Data

(63) Continuation of application No. PCT/JP2019/036729, filed on Sep. 19, 2019.

(30) Foreign Application Priority Data

Sep. 27, 2018  (JP) .............................. JP2018-181933

(51) Int. Cl.
  *C02F 3/30* (2006.01)
  *C02F 1/00* (2006.01)
  *C02F 3/12* (2006.01)

(52) U.S. Cl.
  CPC .............. *C02F 3/301* (2013.01); *C02F 1/004* (2013.01); *C02F 3/1215* (2013.01);
  (Continued)

(58) Field of Classification Search
  CPC ...... C02F 3/302; C02F 3/1263; C02F 3/1268; C02F 2101/16; C02F 2203/006;
  (Continued)

(56) References Cited

FOREIGN PATENT DOCUMENTS

| JP | 2001-62481 | 3/2001 |
|---|---|---|
| JP | 2011-147868 | 8/2011 |

(Continued)

OTHER PUBLICATIONS

International Search Report from International Application No. PCT/JP2019/036729 dated Nov. 19, 2019.

*Primary Examiner* — Nam X Nguyen
*Assistant Examiner* — Ekandra S. Miller-Cruz
(74) *Attorney, Agent, or Firm* — Beyer Law Group LLP

(57) ABSTRACT

An organic wastewater treatment apparatus is operated by switching between a first operation mode and a second operation mode. The first operation mode includes supplying organic wastewater to a dual-use tank and performing an anaerobic treatment process therein, performing a nitrification-denitrification process in a membrane bioreactor treatment tank, and extracting membrane-permeated water from a membrane separation device arranged in the membrane bioreactor treatment tank as treated water. The second operation mode includes supplying the organic wastewater to the dual-use tank and performing an aerobic treatment process therein, supplying mixed liquid containing activated sludge from the dual-use tank to both of the membrane bioreactor treatment tank and a sedimentation tank, performing a nitrification-denitrification process in the membrane bioreactor treatment tank, extracting membrane-permeated water from the membrane separation device arranged in the membrane bioreactor treatment tank as treated water, and also extracting solid-liquid separated liquid from the sedimentation tank as treated water.

9 Claims, 13 Drawing Sheets

(52) U.S. Cl.
CPC ............ *C02F 3/1273* (2013.01); *C02F 3/302* (2013.01); *C02F 2001/007* (2013.01); *C02F 2209/003* (2013.01); *C02F 2209/02* (2013.01); *C02F 2209/03* (2013.01); *C02F 2209/08* (2013.01); *C02F 2209/40* (2013.01)

(58) Field of Classification Search
CPC .. C02F 2209/40; C02F 3/307; C02F 2209/14; C02F 3/12; C02F 3/30; C02F 3/301; C02F 1/004; C02F 3/1215; C02F 3/1273; C02F 2001/007; C02F 2209/003; C02F 2209/02; C02F 2209/03; C02F 2209/08; C02F 3/006; C02F 2101/105; C02F 1/5245; Y02W 10/10
USPC ......................................................... 210/605
See application file for complete search history.

(56) References Cited

FOREIGN PATENT DOCUMENTS

| | | | |
|---|---|---|---|
| JP | 2013-212490 | 10/2013 | |
| JP | 2016-2514 | 1/2016 | |
| KR | 100655471 B1 * | 12/2006 | ................ C02F 3/06 |

* cited by examiner

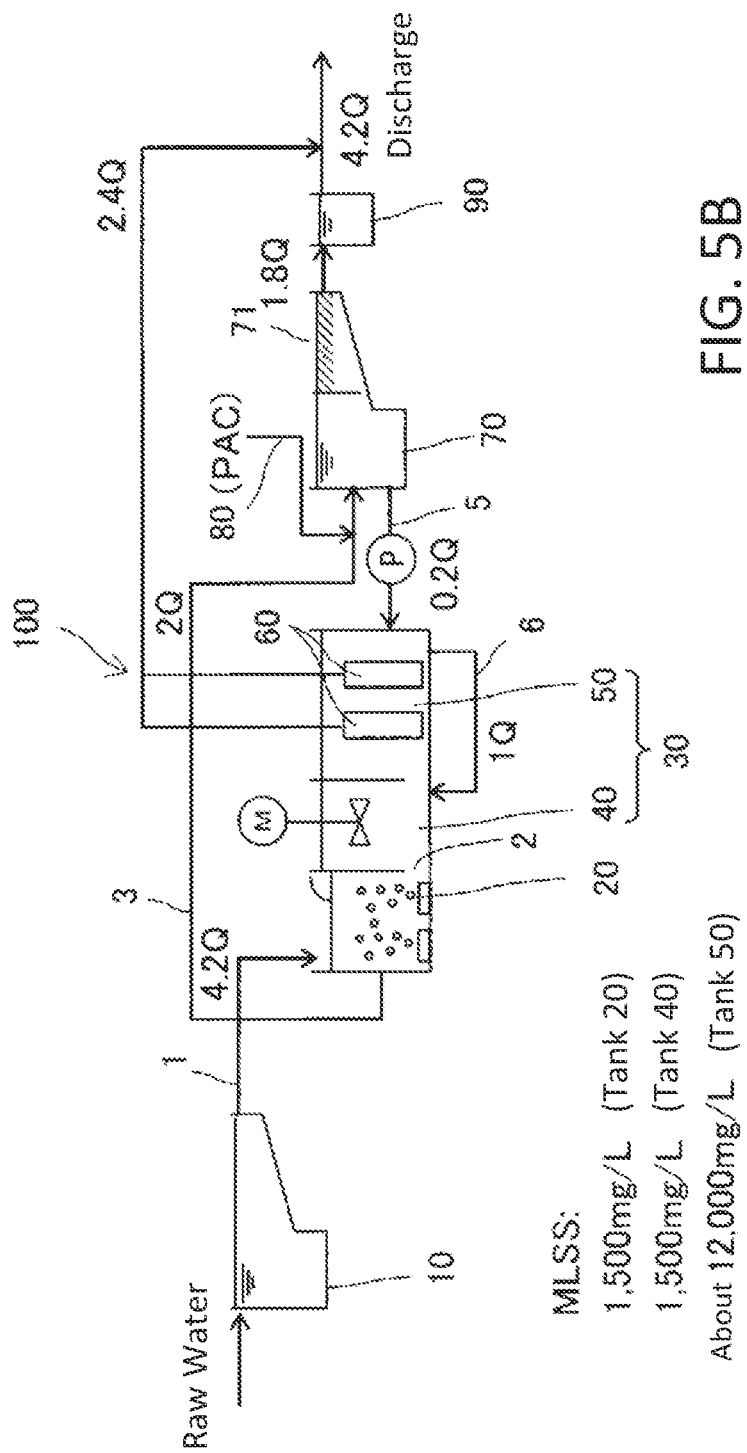

OPERATING METHOD FOR ORGANIC WASTEWATER TREATMENT APPARATUS AND ORGANIC WASTEWATER TREATMENT APPARATUS

CLAIM OF PRIORITY

This application is a Continuation of International Patent Application No. PCT/JP2019/036729, filed on Sep. 19, 2019, which claims priority to Japanese Patent Application No. 2018-181933, filed on Sep. 27, 2018, each of which is hereby incorporated by reference.

BACKGROUND OF THE INVENTION

1. Field of the Invention

The present invention relates to a method for operating an organic wastewater treatment apparatus and an organic wastewater treatment apparatus.

2. Description of the Related Art

A combined sewage treatment facility, which is often used in urban areas, is a facility that transports both rainwater and sewage through a shared sewage culvert. The facility is provided with an organic wastewater treatment apparatus using the A2O (anaerobic-anoxic-aerobic) method (also referred to as the UCT method). The organic wastewater treatment apparatus includes an initial sedimentation basin into which raw sewage flows, a biological treatment tank, and a final sedimentation tank. In the biological treatment tank, an anaerobic tank, an anoxic tank, and an aerobic tank are arranged in this order, such that a circulated anaerobic-aerobic method is employed, in which sludge from the aerobic tank is circulated to the anaerobic tank and the anoxic tank. In the final sedimentation basin, the activated sludge is sedimented and separated from the treated water which has been biologically treated.

According to a conventional operation method of the conventional organic wastewater treatment facility, when an amount of wastewater flowing into the facility in rainy weather exceeds the treatment capacity of the biological treatment tank and the final sedimentation basin, the wastewater is simply discharged after settling and removing solids in the initial sedimentation basin, without performing the subsequent treatment processes in the biological treatment tank.

Japanese Patent Publication No. 2001-62481 discloses an organic wastewater treatment apparatus employing a membrane-separation activated sludge method (MBR: Membrane Bio Reactor) in which organic wastewater with a high nitrogen concentration is biologically treated in a reaction tank provided with an immersion-type membrane separation device.

This type of organic wastewater treatment apparatus is attracting attention as such an organic wastewater treatment apparatus that improves the quality of the treated water in either sunny or rainy weather and also reduces the size of the facility, using the immersion-type membrane separation device instead of a conventional final sedimentation basin.

Japanese Patent Publication No. 2011-147868 discloses a wastewater treatment system having a plurality of reaction series each including an initial sedimentation basin, a reaction tank, a final sedimentation basin, a first flow path connecting the initial sedimentation basin and the reaction tank, and a second flow path connecting the reaction tank and the final sedimentation basin.

In this wastewater treatment system, one of the reaction series among the plurality of reaction series has the reaction tank which is provided with a carrier, a membrane unit, and activated sludge. The system also includes a membrane separation tank in which MLSS (mixed liquor suspended solid) concentration is adjusted to 500-7000 mg/L. Wastewater is supplied to the reaction tank via the first flow path, and the excess wastewater exceeding the treatment capacity of the reaction tanks is supplied to the final sedimentation basin via the second flow path.

BRIEF DESCRIPTION OF THE INVENTION

Since the membrane bioreactor method has an upper limit of the amount of water which can be filtered per unit area of the membrane, designing the facility to be able to filter the entire amount of water corresponding to processing peaks when flow rates suddenly increases in rainy weather and the like, would disadvantageously result in excessive investment in the facility and a low cost effectiveness.

In such a case, as shown in FIG. 8, an organic wastewater treatment system may be modified by combining an organic wastewater treatment apparatus using the membrane bioreactor method and a conventional organic wastewater treatment apparatus using the conventional activated sludge method mentioned above, such that the conventional organic wastewater treatment apparatus can be operated in order to process the peak amount of the sewage inflow, whereby reducing the required facility capacity of the organic wastewater treatment apparatus using the membrane bioreactor method. However, there are the following problems.

Since the quality of the treat water of the conventional activated sludge method is lower than that of the membrane bioreactor method, it is desirable to treat the wastewater only using the membrane bioreactor method in normal times. However, since it is not possible to start up in a short time and operate the conventional organic wastewater treatment apparatus using the conventional activated sludge method for a specific time period such as during the rainy weather, it is necessary to always operate both of the organic wastewater treatment apparatus using the membrane bioreactor method and the conventional organic wastewater treatment apparatus using the conventional membrane separation activated sludge method in parallel, which makes it complicated to determine the amount of wastewater to be distributed to each apparatus.

In addition, in the conventional method, the solid-liquid separation is generally conducted in a sedimentation basin, and it is necessary to keep the MLSS concentration below 3000 mg/L for good solid-liquid separation. Therefore, when the sludge having the MLSS concentration of 8000-1000 mg/L, which is higher than that of the conventional method, is led from the aerobic tank of the membrane bioreactor to the sedimentation basin, the solid-liquid separation in the sedimentation basin may not adequately performed and thus the sludge may flow out with the treated water.

In order to secure the solid-liquid separation performance in the sedimentation basin by reducing the MLSS concentration while the membrane bioreactor method is used, carriers may be added to maintain the treatment capacity as described in Patent Document 2. However, adding the carriers may also be problematic as the screen that prevents the carriers from flowing out into the sedimentation basin may be clogged by the carriers when the flow rate increases.

Accordingly, the purpose of the present invention is to provide a method for operating an organic wastewater treatment apparatus and an organic wastewater treatment apparatus which are capable of discharging properly processed treated water regardless of fluctuations in the inflow volume of the organic wastewater or the treatment load, while suppressing the facility capacity of the organic wastewater treatment apparatus employing the membrane bioreactor method.

In order to achieve the above-described object, a first characteristic configuration of the method for operating an organic wastewater treatment apparatus according to the present invention is a method for operating an organic wastewater treatment apparatus including a dual-use tank, a membrane bioreactor treatment tank, and a sedimentation tank. The method includes a first operation mode in which organic wastewater is supplied to the dual-use tank for an anaerobic treatment process, followed by a nitrification-denitrification process performed in the membrane bioreactor treatment tank, from which membrane-permeated water from the membrane separation device arranged in the membrane bioreactor treatment tank is extracted as treated water, and a second operation mode in which the organic wastewater is supplied to the dual-use tank for an aerobic treatment process, thereby supplying mixed liquid to the membrane bioreactor treatment tank and the sedimentation tank, followed by a nitrification-denitrification process in the membrane bioreactor treatment tank, from which membrane-permeated water from the membrane separation device arranged in the membrane bioreactor treatment tank is extracted as treated water, and also solid-liquid separated liquid is extracted from the sedimentation tank as treated water. The mixed liquid contains activated sludge.

By operating the organic wastewater treatment apparatus in the first operation mode when the amount of organic wastewater to be treated is in a steady state, while operating the organic wastewater treatment apparatus in the second operation mode when the amount of the organic wastewater to be treated increases excessively, it becomes possible to avoid excessive investment in the facility, such as installing a number of membrane separation devices to cope with the peak water volume of the organic wastewater.

In other words, by gradually returning the activated sludge from the membrane bioreactor treatment tank to the dual-use tank on an upstream side during the operation in the first operation mode, the MLSS concentration in the dual-use tank can be significantly lowered compared with that in an aerobic tank. On the other hand, in the second operation mode, the dual-use tank which is used for anaerobic treatment process in the first operation mode is now used for an aerobic treatment process in the second operation mode so as to function as an initial adsorption tank, such that part of the sludge which has treated by the initial adsorption process is sent to the sedimentation tank so as to ensure the solid-liquid separation performance in the sedimentation tank. Accordingly, the BOD (biological oxygen demand) load of the treated water as a whole is reduced without overloading the membrane separation device.

The initial adsorption process includes a physical absorption in which fine particles and soluble organic matter in the organic wastewater are physically absorbed on the surface of the activated sludge by sticky gelatin substances secreted by aerobic microorganisms in the activated sludge, and a biosorption in which the physically absorbed organic matter is quickly taken up by microorganisms. The BOD is greatly reduced in a few tens of minutes after the activated sludge comes into contact with the organic wastewater.

A second characteristic configuration of the method for operating the organic wastewater treatment apparatus according to the present invention is that, in addition to the first characteristic configuration described above, the mixed liquid is returned from the membrane bioreactor treatment tank to the dual-use tank in the first and second operation modes.

In the first operation mode, the mixed liquid returned from the membrane bioreactor treatment tank promotes the anaerobic treatment process, i.e. the denitrification process, while in the second operation mode, the mixed liquid returned from the membrane bioreactor treatment tank promotes the aerobic treatment process, i.e. the initial adsorption process.

A third characteristic configuration of the method for operating the organic wastewater treatment apparatus according to the present invention is that, in addition to the first and/or second characteristic configurations described above, the mixed liquid is returned from the sedimentation tank to the membrane bioreactor treatment tank in the second operation mode.

By returning the mixed liquid from the sedimentation tank to the membrane bioreactor treatment tank, a decrease in the MLSS concentration in the membrane bioreactor treatment tank can be avoided.

A fourth characteristic configuration of the method for operating the organic wastewater treatment apparatus according to the present invention is that, in addition to any of the first to third characteristic configurations described above, the organic wastewater is divided and supplied to the dual-use tank and the membrane bioreactor treatment tank in the second operation mode.

Depending on the degree to which the organic wastewater is initially absorbed in the dual-use tank, the membrane bioreactor treatment tank in the subsequent stage may lack a BOD source, making it difficult to perform appropriate biological treatment process therein. However, even in such a case, if the organic wastewater is divided and supplied to the dual-use tank and the membrane bioreactor treatment tank, an appropriate biological treatment process can be conducted in the membrane bioreactor treatment tank. Another advantage is that the actual HRT (hydraulic retention time) of the dual-use tank will become longer, and the quality of the treated water of the solid-liquid separated liquid from the sedimentation tank will be improved.

A fifth characteristic configuration of the method for operating the organic wastewater treatment apparatus according to the present invention is that, in addition to any of the first through fourth characteristic configurations described above, in the second operation mode, the amount of treated water withdrawn from the membrane bioreactor treatment tank and the amount of the treated water withdrawn from the sedimentation tank are controlled (by increasing or decreasing the amounts) according to a position of the sludge interface in the sedimentation tank or the quality of the treated water.

For example, when the sludge interface in the sedimentation tank rises and a proper solid-liquid separation process becomes difficult, the solid-liquid separation process in the sedimentation tank can be stabilized by increasing the processing volume in the membrane bioreactor treatment tank, and conversely, when the sludge interface in the sedimentation basin falls and the solid-liquid separation is properly performed, the load on the solid-liquid separation process in the membrane bioreactor treatment tank can be reduced by decreasing the treatment volume in the membrane bioreactor treatment tank.

When it is determined that the quality of the treated water has significantly deteriorated based on water quality indicators for the sedimentation tank such as COD (chemical oxygen demand), SS (suspended solid), T-N (total nitrogen), T-P (total phosphorous), etc., the solid-liquid separation process in the sedimentation tank can be stabilized by increasing the processing volume in the membrane bioreactor treatment tank. On the other hand, the load on the membrane separation device can be reduced by decreasing the processing volume in the membrane bioreactor treatment tank.

A sixth characteristic configuration of the method for operating the organic wastewater treatment apparatus according to the present invention is that, in addition to any of the first through fifth characteristic configurations described above, the sedimentation tank is provided with a filtration device, and the filtered water which has passed through the filtration device is withdrawn as the treated water in the second operation mode.

By providing the sedimentation tank with the filtration device, even if the MLSS concentration increases, such a situation that the sludge flows into the treated water can be prevented by the filtration device.

A seventh characteristic configuration of the method for operating the organic wastewater treatment apparatus according to the present invention is that, in addition to any of the first through sixth characteristic configurations described above, a flocculant is added to the membrane bioreactor treatment tank in the first operation mode, and to the sedimentation basin or a flow inlet of the sedimentation basin in the second operation mode.

In the first operation mode, adding the flocculant to the membrane bioreactor treatment tank allows an efficient dephosphorization, and in the second operation mode, adding the flocculant to the sedimentation tank or the flow inlet thereof enhances the COD of the treated water, the dephosphorization effect, and the sedimentation-separation effect on the sludge.

An eighth characteristic configuration of the method for operating the organic wastewater treatment apparatus according to the present invention is that, in addition to any of the first through seventh characteristic configurations described above, the operation mode is switched between the first operation mode and the second operation mode depending on any of the following indicators: a flow rate of the organic wastewater, a COD load, a $NH_4$—N load, a transmembrane pressure difference, and a water temperature.

An appropriate operation can be achieved by determining in which of the first and second operation modes should the apparatus be operated based on one of the following indicators: the flow rate of the organic wastewater, the COD load, the $NH_4$—N load, the transmembrane pressure difference, and the water temperature.

For example, operating the apparatus in the first operation mode is desirable when the flow rate of the organic wastewater excessively increases, when the intermembrane differential pressure abnormally increases, or when the treatment efficiency decreases due to a drop in the water temperature, while operating the apparatus in the second operation mode is desirable when the COD load or the $NH_4$—N load abnormally increases.

A ninth characteristic configuration of the method for operating the organic wastewater treatment apparatus according to the present invention is that, in addition to any of the first through eighth characteristic configurations described above, a cleaning process is performed to clean the sedimentation tank after switching the operation mode from the second operation mode to the first operation mode.

When the operation mode is switched from the second operation mode to the first operation mode, the sedimentation tank that has been operated in the second operation mode may have residual sludge remaining therein, which may decompose. By performing the above-mentioned cleaning process, such decomposition of the residual sludge can be avoided.

The first characteristic configuration of the organic wastewater treatment apparatus according to the present invention is that the apparatus includes a dual-use tank capable of switching between an aerobic treatment process and an anaerobic treatment process, a membrane bioreactor treatment tank in which a nitrification-denitrification process is performed and from which membrane permeated water is extracted as treated water, a sedimentation tank, a raw water supply path for supplying organic wastewater to the dual-use tank, a first mixed liquid path for sending a mixed liquid from the dual-use tank to the membrane bioreactor treatment tank, and a second mixed liquid path for sending the mixed liquid from the dual-use tank to the sedimentation basin.

A second characteristic configuration of the organic wastewater treatment apparatus according to the present invention is that, in addition to the first characteristic configuration described above, the apparatus further includes a third mixed liquid path for returning the mixed liquid from the membrane bioreactor treatment tank to the dual-use tank.

A third characteristic configuration of the organic wastewater treatment apparatus according to the present invention is that, in addition to the first and/or second characteristic configurations described above, the apparatus further includes a fourth mixed liquid path for returning the mixed liquid from the sedimentation tank to the membrane bioreactor treatment tank.

A fourth characteristic configuration of the organic wastewater treatment apparatus according to the present invention is that, in addition to any of the first through third characteristic configurations described above, the sedimentation tank is provided with a filtration device.

A fifth characteristic configuration of the organic wastewater treatment apparatus according to the present invention is that, in addition to any of the first through fourth characteristic configurations described above, the sedimentation tank is provided with a flocculant adding device for switchably adding a flocculant to either one of the membrane bioreactor treatment tank and the sedimentation tank.

As explained above, the present invention provides a method for operating an organic wastewater treatment apparatus and an organic wastewater treatment apparatus capable of discharging treated water which is properly treated regardless of fluctuations in the inflow volume of the organic wastewater and the treatment load, while suppressing the process capacity of the organic wastewater treatment apparatus employing the membrane bioreactor method.

BRIEF DESCRIPTION OF THE DRAWINGS

FIG. 5B is a diagram illustrating the second operation mode in the method for operating the organic wastewater treatment apparatus in accordance with yet another embodiment.

DETAILED DESCRIPTION OF EMBODIMENTS OF THE INVENTION

Figure 1A:
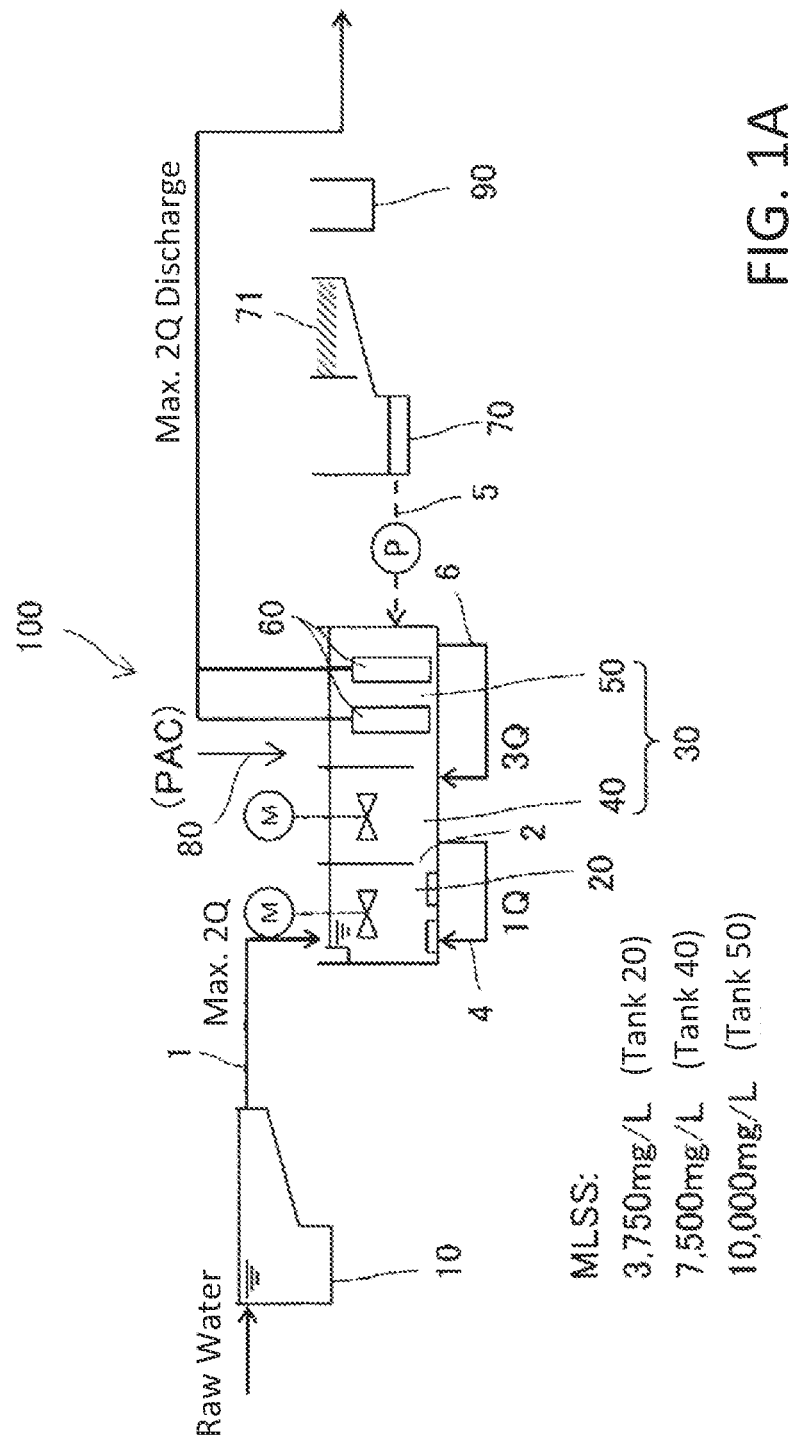
FIG. 1A is a diagram illustrating a first operation mode in a method for operating an organic wastewater treatment apparatus according to the present invention.

A method for operating an organic wastewater treatment apparatus and the organic wastewater treatment apparatus according to the present invention will be described by referring to the drawings.

Figure 1B:
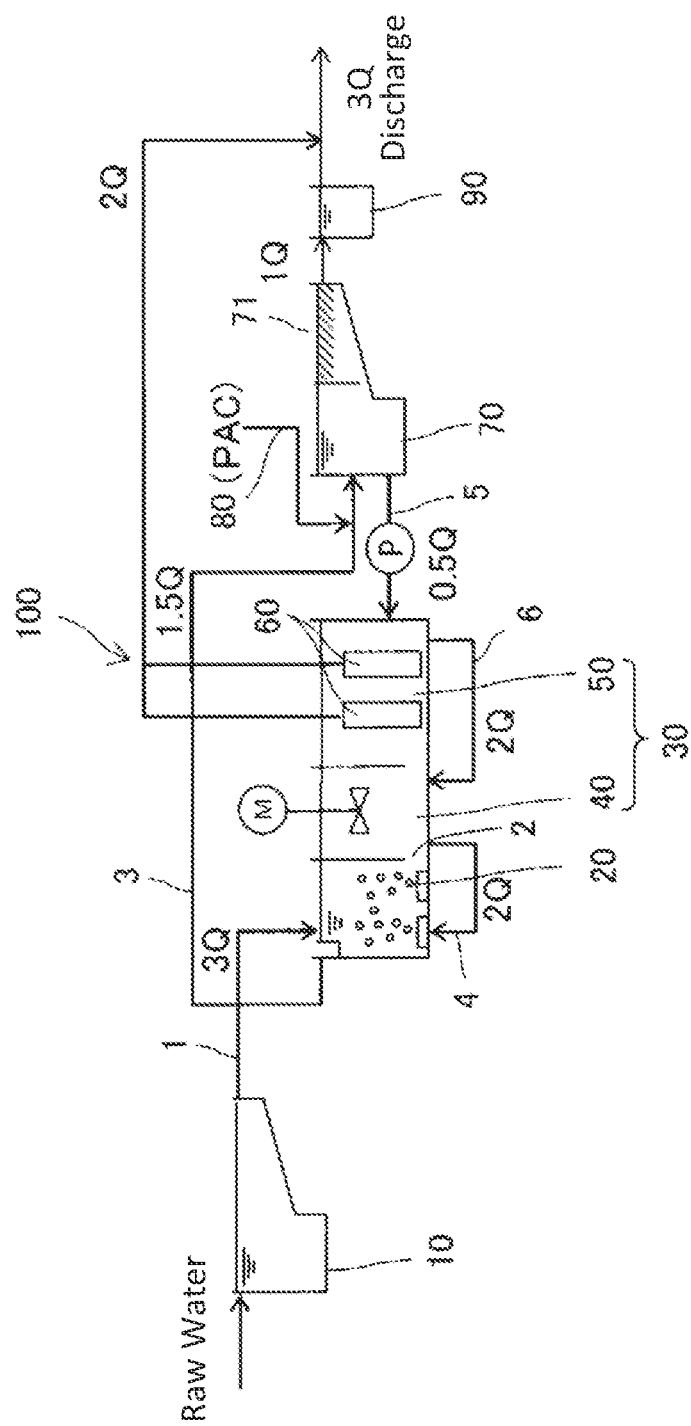
FIG. 1B is a diagram illustrating a second operation mode in the method for operating the organic wastewater treatment apparatus according to the present invention.

As shown in FIGS. 1A and 1B, the organic wastewater treatment apparatus 100 is an apparatus for purifying by biologically treating organic wastewater such as sewage introduced as raw water, and discharging treated water into a river or the like. The apparatus 100 includes an initial sedimentation basin 10, a dual-use tank 20 which can be switchably used for an aerobic treatment process and an anaerobic treatment process, a membrane bioreactor treatment tank 30 which performs a nitrification-denitrification process, and from which membrane permeated water from a membrane separation device 60 immersed therein is extracted as the treated water, a final sedimentation basin 70, and a disinfection tank 90, among others.

The dual-use tank 20 is provided with an agitator and an aeration device. When the aeration device is activated, the dual-use tank 20 is conditioned to an aerobic state and functions as an aerobic tank, while the aeration device is stopped, the dual-use tank 20 is conditioned to an anaerobic state and functions as an anaerobic tank in which the agitator is activated. In addition, the final sedimentation basin 70 functions as the sedimentation tank 70 of the present invention, and the sedimentation tank 70 may be provided with an inclined plate 71 to improve a sedimentation efficiency.

The organic wastewater treatment apparatus 100 further includes a raw water supply path 1 for supplying the organic wastewater to the dual-use tank 20, a first mixed liquid path 2 for allowing the mixed liquid in the dual-use tank 20 to flow into the membrane bioreactor treatment tank 30, a second mixed liquid path 3 for allowing the mixed liquid in the dual-use tank 20 to flow into the sedimentation tank 70, a third mixed liquid path 4 for returning the mixed liquid in the membrane bioreactor treatment tank 30 to the dual-use tank 20, and a fourth mixed liquid path 5 for returning the mixed liquid in the sedimentation tank 70 to the membrane bioreactor treatment tank 30.

The membrane bioreactor treatment tank 30 is a biological treatment tank in which organic bodies are decomposed by microorganisms, and may include two tanks: an anoxic tank 40 provided with an agitator, and an aerobic tank 50 provided with an aeration device (not shown in the figures) and a membrane separation device 60 immersed therein. A sludge return path 6 returns the sludge from the aerobic tank 50 to the anoxic tank 40, and nitrate-nitrogen, which has been nitrified from ammoniacal nitrogen in the aerobic tank 50, is also returned via the sludge return path 6 to the anoxic tank 40 in which a denitrification process is performed.

The organic wastewater treatment apparatus 100 is configured to be operated in two different operation modes by switching between a first operation mode (see FIG. 1A) and a second operation mode (see FIG. 1B). In the first operation mode, as shown in FIG. 1A, the organic wastewater is supplied to the dual-use tank 20 in which an anaerobic treatment process is performed thereon, and then a nitrification-denitrification process is performed thereon in the membrane bioreactor treatment tank 30, and the membrane permeated liquid of the membrane separation device 60 disposed in the membrane bioreactor treatment tank 30 is extracted as treated water. In the second operation mode, as shown in FIG. 1B, the organic wastewater is supplied to the dual-use tank 20 in which an aerobic treatment process is performed thereon, and then mixed liquid (which is the aerobically-treated wastewater containing activated sludge) is supplied to the membrane bioreactor treatment tank 30 and to the sedimentation tank 70, and then a nitrification-denitrification process is performed in the membrane bioreactor treatment tank 30 and the membrane permeated liquid from the membrane separation device 60 disposed in the membrane bioreactor treatment tank 30 is extracted as the treated water, while solid-liquid separated liquid from the sedimentation tank 70 is also extracted as the treated water.

The switching between the first operation mode and the second operation mode may be performed using one of the following as an indicator: a flow rate of the organic wastewater, a COD load, a $NH_4$—N load, a transmembrane pressure difference, and a water temperature. For example, the apparatus 100 may be configured to operate in the second operation mode when the flow rate of the organic wastewater increases excessively, when the transmembrane pressure difference of the membrane separation device 60 increases abnormally, or when the treatment efficiency decreases due to a water temperature drop in winter, and to operate in the first operation mode when the COD load and the $NH_4$—N load increase abnormally.

In the first operation mode, as shown in FIG. 1A, the apparatus 100 is configured as a UCT-type MBR performing an A2O treatment process, including the dual-use tank 20 which is functioning as an anaerobic tank, and the membrane bioreactor treatment tank 30 including the anoxic tank 40 and the aerobic tank 50.

For example, the organic wastewater (post-sedimentation water) with a flow rate of 2Q, which has been solid-liquid separated in the initial sedimentation basin 10 provided in the raw water supply path 1, becomes mixed liquid (also referred to as mixed water) mixed with activated sludge in the dual-use tank 20 and is anaerobically treated therein, which is then denitrified in the anoxic tank 40 of the membrane bioreactor treatment tank 30 and aerobically treated in the aerobic tank 50. The thus treated mixed water is solid-liquid separated by the membrane separation device 60 and extracted as permeated water, and then is discharged to a river or the like as the treated water with a maximum flow rate of 2Q.

The mixed liquid whose ammoniacal nitrogen is nitrified in the aerobic tank 50 is returned to the anoxic tank 40 with a flow rate of 3Q through the sludge return path 6, and the mixed liquid is denitrified in the anoxic tank 40. The mixed liquid is also returned, with a flow rate of 1Q, from the anoxic tank 40 to the dual-use tank 20 via the third mixed liquid path 4, and phosphorus in the mixed liquid is desorbed in the dual-use tank 20. As a result, the phosphorus contained in the organic wastewater is excessively absorbed in the aerobic tank 50 on the downstream side, and thus the phosphorus concentration of the membrane permeated water is greatly reduced.

By gradually returning the sludge from the aerobic tank 50 to the dual-use tank 20 via the sludge return path 6 and the third mixed liquid path 4, the MLSS concentration in the dual-use tank 20 can be significantly lowered compared to that in the aerobic tank 50. In the example of FIG. 1A, the MLSS concentration in the aerobic tank 50 is 1000 mg/L, while the MLSS concentration in the anoxic tank 40 is 7500 mg/L, and the MLSS concentration in the dual-use tank 20 is 3750 mg/L.

In the second operation mode of the apparatus 100, as shown in FIG. 1B, the aeration device 21 provided in the dual-use tank 20 is activated (i.e. operated) to make the dual-use tank 20 function as an aerobic tank, that is, an initial adsorption tank, and then the nitrification-denitrification process is conducted in the membrane bioreactor treatment tank 30 having the anoxic tank 40 and the aerobic tank 50.

For example, the organic wastewater (post-sedimentation water) with a flow rate of 3Q (which is higher than the flow rate of 2Q of the organic wastewater in the first operation mode mentioned above), which has been solid-liquid separated in the initial sedimentation basin 10 provided in the raw water supply path 1, becomes the mixed liquid mixed with the activated sludge in the dual-use tank 20. After the initial adsorption process is performed in the dual-use tank 20, a half of the mixed liquid with the flow rate of 1.5Q is supplied to the membrane bioreactor treatment tank 30 via the first mixed liquid path 2, and the other half of the mixed water with a flow rate of 1.5Q is supplied to the sedimentation tank 70 via the second mixed liquid path 3.

In the membrane bioreactor treatment tank 30, from among the mixed liquid which has been denitrified in the anoxic tank 40 on the upstream side and then aerobically treated in the aerobic tank 50, the mixed liquid with a flow rate of 2Q is returned to the anoxic tank 40 via the sludge return path 6, and then the mixed liquid in the anoxic tank 40 is returned therefrom, with a flow rate of 2Q, to the dual-use tank 20 via the third mixed liquid path 4.

Then, the permeated water, which has been solid-liquid separated by the membrane separation device 60 in the aerobic tank 50, is discharged into a river or the like with a maximum flow rate of 2Q. In addition, the treated water, which has been solid-liquid separated in the sedimentation tank 70, is discharged through the disinfection tank 90 into a river or the like, while the mixed liquid is also returned, as return sludge, from the sedimentation tank 70 to the membrane bioreactor treatment tank 30 through the fourth mixed liquid path 5 with a flow rate of 0.5Q.

By employing a lower circulation rate of the sludge from the membrane bioreactor treatment tank 30 to the dual-use tank 20 than that in the first operation mode, the MLSS concentration in the dual-use tank 20 can be further reduced, and by sending a portion of the sludge which has been treated by the initial adsorption process to the sedimentation tank 70, the solid-liquid separation performance in the sedimentation tank 70 can be maintained.

In other words, by operating the organic wastewater treatment apparatus 100 in the first operation mode when the volume of the organic wastewater to be treated or the treatment load has a steady value, and in the second operation mode when the volume of the organic wastewater to be treated or the treatment load increases excessively, it becomes possible to avoid excessive investment in the facility, such as installing a number of membrane separation devices 60 corresponding to the peak processing volume of the organic wastewater, while reducing the BOD and the COD load of the treated water as a whole, without imposing an excessive load on the membrane separation device. Accordingly, even if the organic wastewater has the peak water volume, the amount of water permeating the membrane separation device 60 can be controlled, and thus it is also possible to reduce the frequency of chemical cleaning of the membranes of the membrane separation device 60.

The Initial adsorption refers to such a process including a physical absorption in which fine particles and dissolved organic matter in the organic wastewater are physically absorbed onto the surface of the activated sludge by the sticky gelatin substance secreted by the aerobic microorganisms in the activated sludge, and a biosorption in which the physically absorbed organic matter is quickly taken up by the microorganisms, resulting in a significant decrease in the BOD within a few tens of minutes after the activated sludge and the organic wastewater come into contact each other.

Since the mixed liquid is returned from the membrane bioreactor treatment tank 30 to the dual-use tank 20 via the third mixed liquid path 4 in both of the first and second operation modes, the mixed liquid returned from the membrane bioreactor treatment tank 30 promotes the anaerobic treatment, i.e., denitrification and/or dephosphorization process in the dual-use tank 20 during the first operation mode, while the mixed liquid returned from the membrane bioreactor treatment tank 30 promotes the aerobic treatment, i.e., the initial adsorption process in the dual-use tank 20 during the second operation mode.

In addition, since the mixed liquid is returned from the sedimentation tank 70 to the membrane bioreactor treatment tank 30 via the fourth mixed liquid path 5, the MLSS concentration in the membrane bioreactor treatment tank 30 is prevented from decreasing by the mixed liquid returned from the sedimentation tank 70.

The organic wastewater treatment apparatus 100 described above may further include a flocculant adding device 80, which is configured to switch the addition target such that the flocculant is added to the membrane bioreactor treatment tank 30 in the first operation mode, while the flocculant is added to the sedimentation tank 70 in the second operation mode. For example, the flocculant adding device 80 can be constructed with a chemical tank filled with the flocculant, supply paths provided from the chemical tank to the membrane bioreactor treatment tank 30 and the sedimentation basin 70, and valves provided in each supply path.

In the first operation mode, the flocculant added to the membrane bioreactor treatment tank 30 causes the dissolved phosphorus to be absorbed by the activated sludge and then separated by the membrane filtration, while in the second operation mode, the dissolved phosphorus is absorbed by the activated sludge flowing into the sedimentation tank so as to be separated by sedimentation process in the sedimentation tank. Accordingly, in the both cases, the effect of phosphorus removal from the treated water can be increased. Inorganic flocculants containing aluminum salts such as polyaluminum chloride (PAC) and aluminum sulfate, and iron salts such as ferric chloride are suitable as the flocculants.

The sedimentation tank 70 may be provided with a drain plug at a sludge accumulation section where the sludge is settled and accumulated, and a washing nozzle from which washing water is jetted out toward the sludge accumulation section. After the operation mode is switched from the second operation mode to the first operation mode, a cleaning process may be performed, in which the residual sludge is washed away from the sludge accumulation section by supplying water from the washing nozzle to the sedimentation tank 70 with the drain plug opened, where the drain plug is closed before switching back from the first operation mode to the second operation mode.

When the operation mode is switched from the second operation mode to the first operation mode, the sludge may remain in the sedimentation tank 70 which has been operated in the second operation mode, where such residual sludge may become decomposed. However, even in such a case, the decomposition of the residual sludge can be avoided by performing the above-described cleaning process with opening and closing of the drain plug. Furthermore, it becomes unnecessary to install a separate sludge scraping mechanism in the sedimentation tank 70.

Other embodiments of the present invention will be described below. In the following description, a flow rate balance of each treatment tank and the MLSS concentration in each tank are noted in the figures, and further explanation in the text description is omitted.

Figure 2:
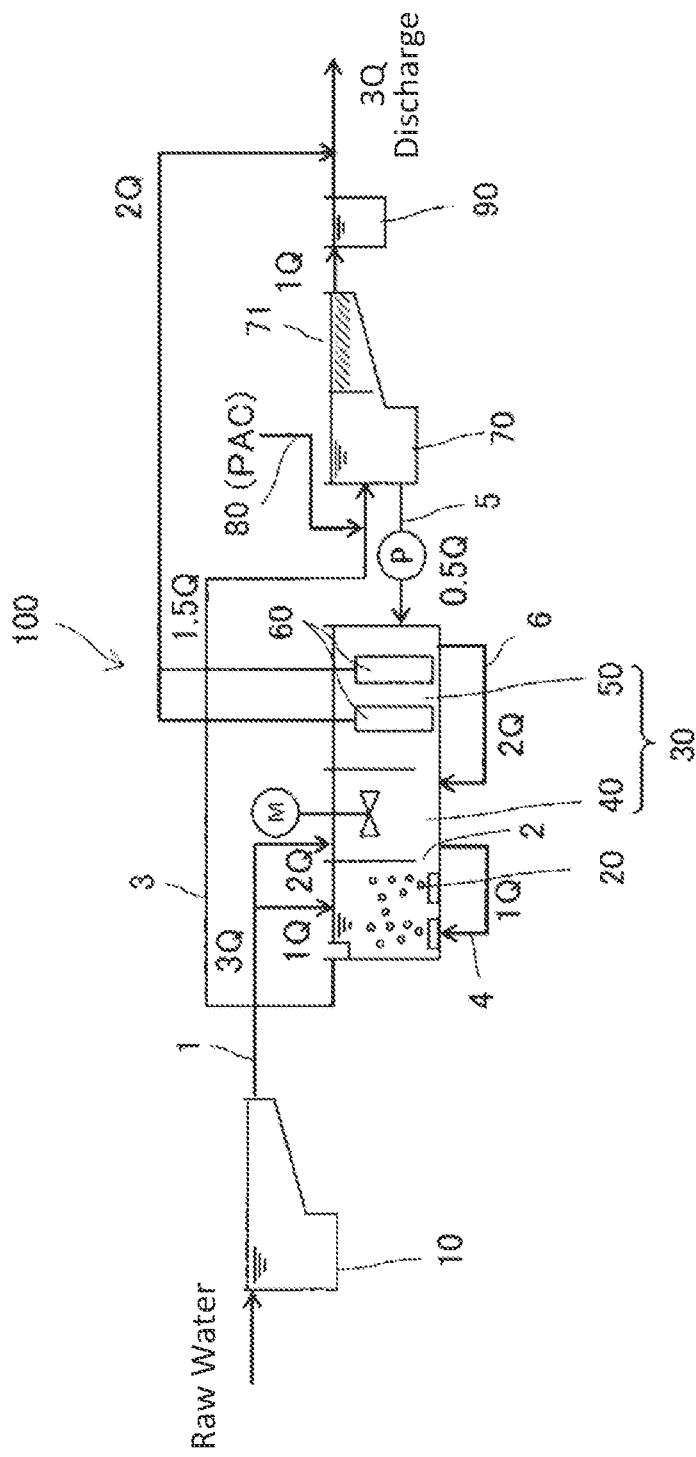
FIG. 2 is a diagram illustrating the second operation mode in the method for operating the organic wastewater treatment apparatus in accordance with another embodiment.

As shown in FIG. 2, in the second operation mode, the post-sedimentation water may be divided and supplied to the dual-use tank 20 and the membrane bioreactor treatment tank 30. Depending on the degree to which the organic wastewater is treated by the initial absorption process in the dual-use tank 20, there may be such a risk that the anoxic tank 40 in the membrane bioreactor treatment tank 30 on the downstream side may not have sufficient BOD source to perform the biological treatment process appropriately.

Even in such a case however, by dividing and distributing the organic wastewater (i.e., the post-sedimentation water) to both of the dual-use tank 20 and the anoxic tank 40 of the membrane bioreactor treatment tank 30, an appropriate biological treatment process can be performed in the membrane bioreactor treatment tank 30. Although the distribution ratio of the post-sedimentation water may be fixed, it is preferable to control the distribution ratio so as to correspond to the distribution ratio between the membrane separation device 60 and the sedimentation tank 70.

By monitoring the sludge interface in the sedimentation tank 70, if a rising sludge interface poses a risk of failure in the solid-liquid separation, the amount of the permeated water through the membrane separation device 60 can be increased to suppress the amount of water distributed to the sedimentation tank 70 side, so as to avoid a sludge leakage from the sedimentation tank 70 and thus prevent the treated water quality from deteriorating. A human operator may visually observe the sludge interface, or a surveillance camera may be used to monitor the sludge interface and an automatic determination may be made by processing the images captured by the camera.

Accordingly, in the second operation mode, the processing volume in the membrane bioreactor treatment tank 30 and that in the sedimentation tank 70 may be controlled according to the position of the sludge interface in the sedimentation tank 70 or the quality of the treated water.

For example, when the sludge interface in the sedimentation tank 70 rises and performing a proper solid-liquid separation becomes difficult, increasing the treatment volume in the membrane bioreactor treatment tank 30 can stabilize the solid-liquid separation in the sedimentation tank 70. On the other hand, when the sludge interface in the sedimentation tank 70 falls and a proper solid-liquid separation is being performed, decreasing the treatment volume in the membrane bioreactor treatment tank 30 can reduce the load on the membrane separation device 60.

When the quality of the treated water is determined to be significantly deteriorated, based on indicators such as the COD, SS, T-N, and T-P, the solid-liquid separation process in the sedimentation tank 70 can be stabilized by increasing the processing volume in the membrane bioreactor treatment tank 30, while the load on the membrane separation device 60 can be reduced by decreasing the processing volume in the membrane bioreactor treatment tank 30.

Figure 3A:
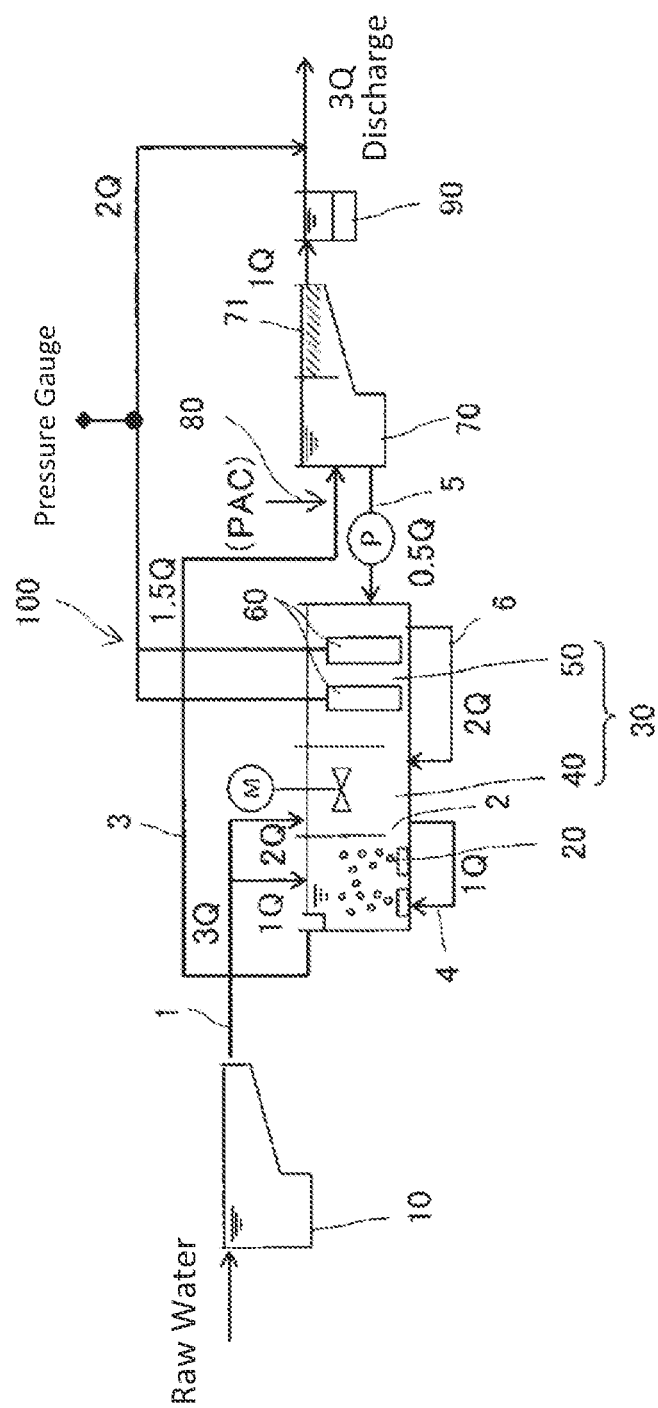
FIG. 3A is a diagram illustrating the second operation mode in the method for operating the organic wastewater treatment apparatus in accordance with yet another embodiment.

FIG. 3A shows an example in which a pressure gauge is installed to detect the differential pressure of the MBR so as to maximize the processing capacity of the MBR. Based on the value of the pressure gage, the apparatus is operated by setting the amount of permeated water withdrawn by the membrane separation device 60 to the maximum value which does not cause the membrane clogged.

Figure 3B:
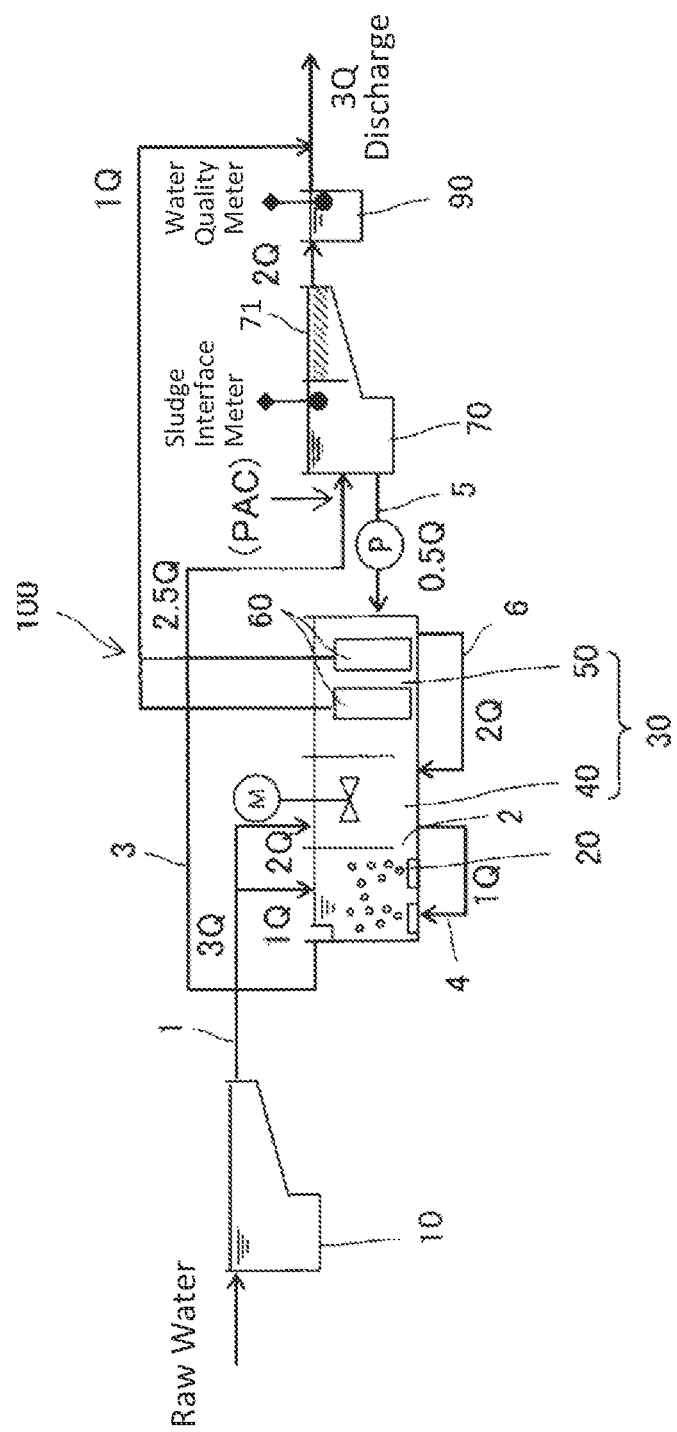
FIG. 3B is a diagram illustrating the second operation mode in the method for operating the organic wastewater treatment apparatus in accordance with yet another embodiment.

FIG. 3B shows another example in which a sludge interface meter and/or a water quality meter are/is installed, such that the amount of treatment process in the membrane bioreactor treatment tank 30 and that in the sedimentation tank 70 are controlled according to the measurements.

Figure 4A:
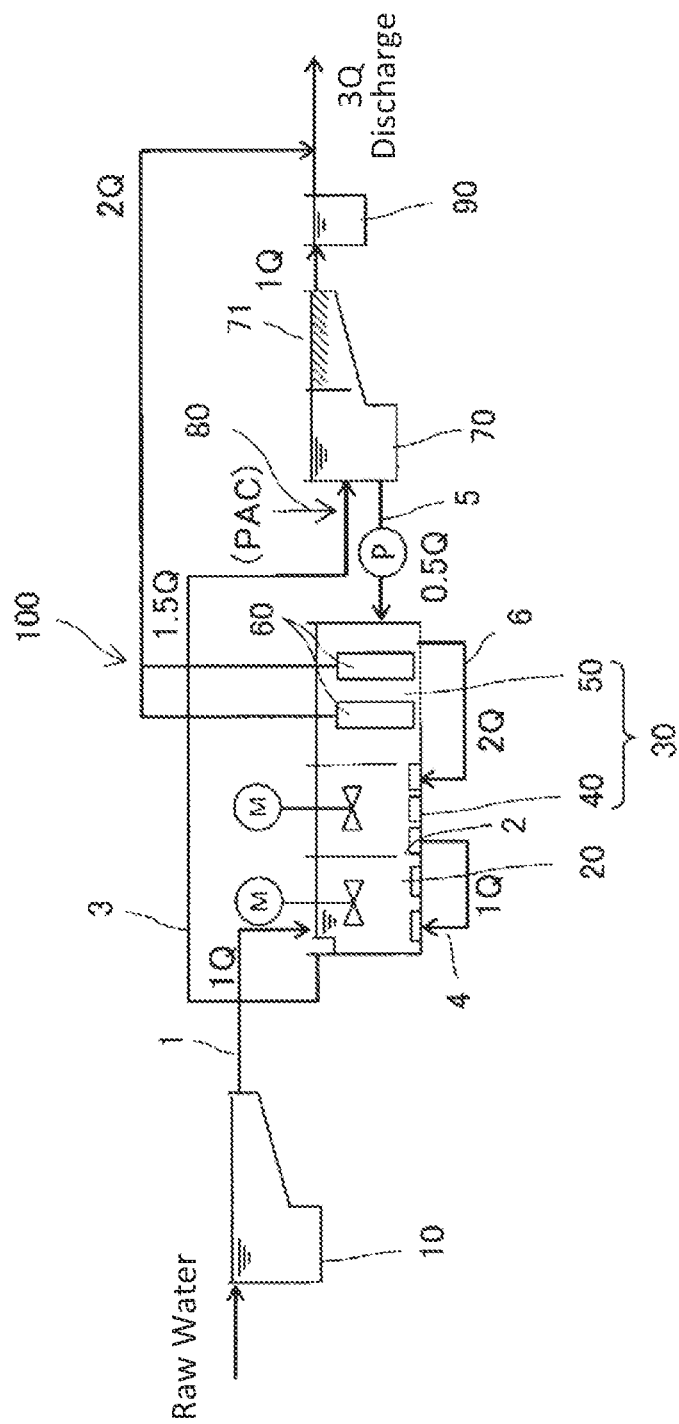
FIG. 4A is a diagram illustrating the second operation mode in the method for operating the organic wastewater treatment apparatus in accordance with yet another embodiment.

In FIG. 1B, such an example has been explained in which the dual-use tank 20 in the second operation mode functions as an aerobic tank, and the post-sedimentation water is supplied to the dual-use tank 20. However, as shown in FIG. 4A, it is possible that the dual-use tank 20 functions as an anoxic tank during the second operation mode in order to prioritize the denitrification reaction under clear weather conditions. In this case, pH adjustment in the anoxic tank 40 becomes unnecessary.

Figure 4B:
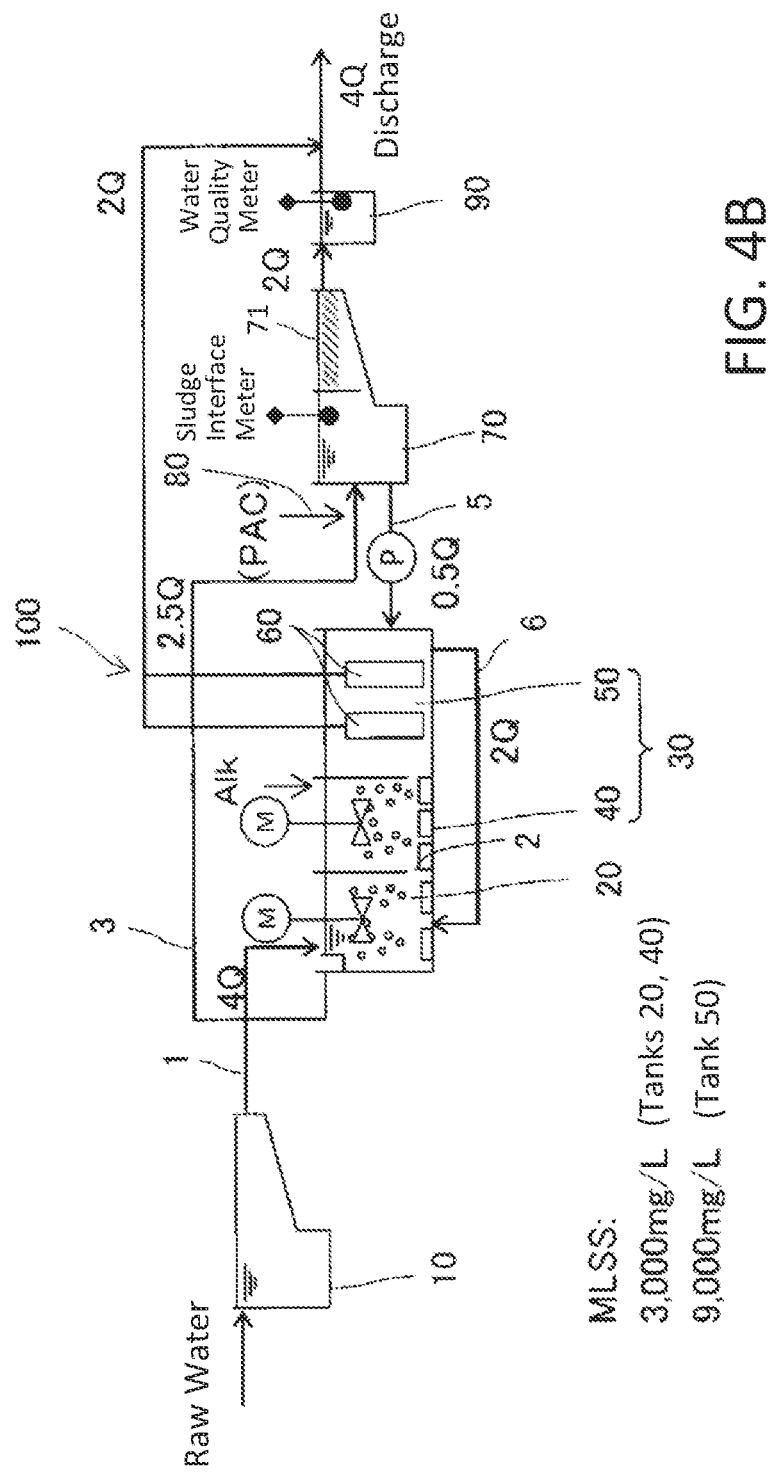
FIG. 4B is a diagram illustrating the second operation mode in the method for operating the organic wastewater treatment apparatus in accordance with yet another embodiment.

As shown in FIG. 4B, both of the dual-use tank 20 and the anoxic tank 40 may be provided with respective aeration devices such that all of the tanks function as aerobic tanks so as to maximize the amount of water to be treated using the existing structure. In this case, an alkaline agent can be added to the anoxic tank 40, which functions as an aerobic tank, in order to keep the pH of the mixed liquid from dropping.

Figure 5A:
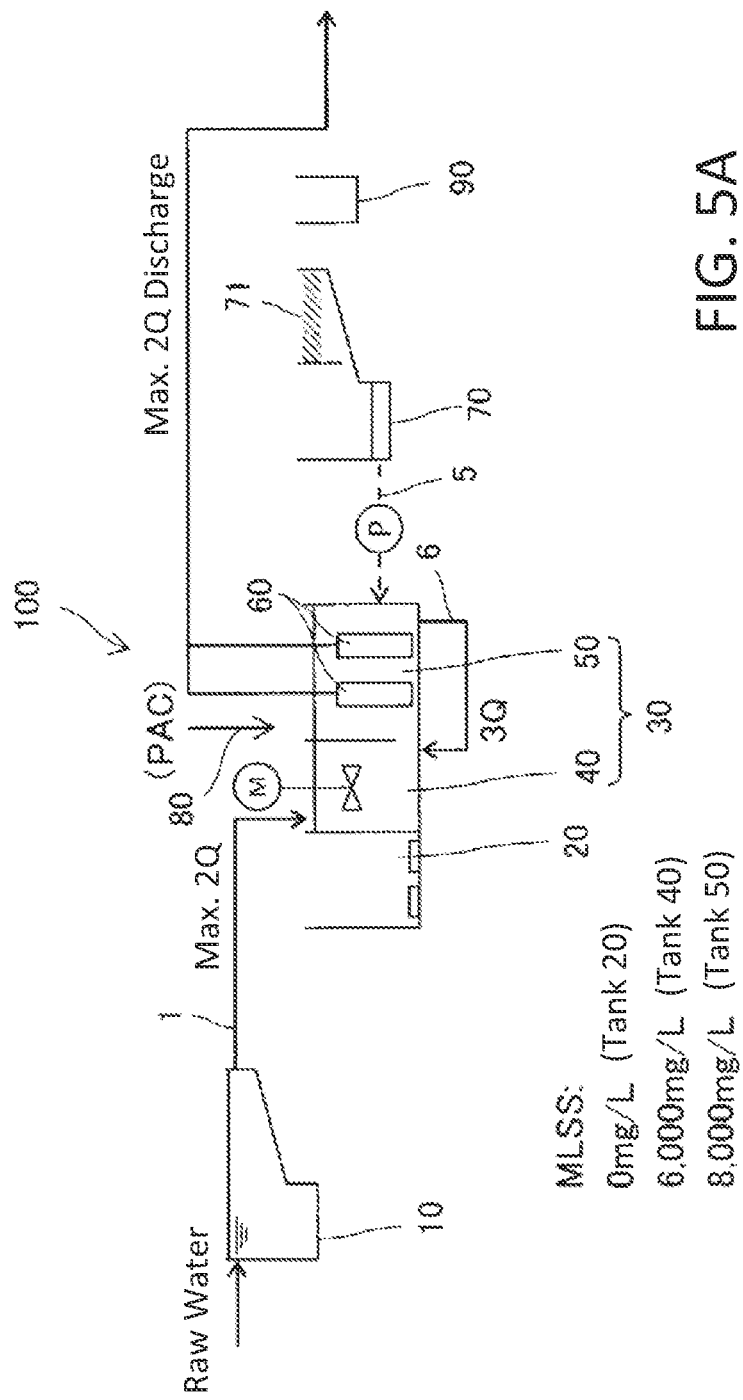
FIG. 5A is a diagram illustrating the second operation mode in the method for operating the organic wastewater treatment apparatus in accordance with yet another embodiment.

As shown in FIG. 5A, it is also possible to supply the post-sedimentation water from the initial sedimentation basin 10 directly to the anoxic tank 40 without using the dual-tank 20 in the first operation mode, and to operate the membrane bioreactor treatment tank 30 using the AO method in which the anaerobic treatment process is only performed by the anoxic tank 40 and the aerobic treatment process is performed by the aerobic tank 50, while in the second operation mode, as shown in FIG. 5B, it is possible to supply the post-sedimentation water to the dual-use tank 20 and allow the dual-use tank 20 to function as an aerobic tank, such that overflow water from the anoxic tank 40 is led to the dual tank 20 for the initial adsorption treatment and then transferred to the sedimentation tank 70. That is, the function of the dual-use tank 20 can be switched such that the dual-use tank 20 functions as a bypassed tank (i.e., not in use) in the first operation mode, and functions as an aerobic tank in the first operation mode to perform the initial adsorption treatment.

For example, in the first operation mode, as shown in FIG. 5A, the post-sedimentation water with a flow rate of 2Q is fed into the anoxic tank 40 of the membrane bioreactor treatment tank 30 in which the denitrification process is performed thereon, and after aerobically treated in the aerobic tank 50 and solid-liquid separated by the membrane separation device 60, the permeated water is discharged to a river or the like as the treated water with a maximum flow rate of 2Q.

The mixed liquid in which ammoniacal nitrogen has been nitrified in the aerobic tank 50 is returned to the anoxic tank 40 with a flow rate of 3Q via the sludge return path 6, and then is denitrified in the anoxic tank 40. By returning the mixed liquid from the aerobic tank 50 to the anoxic tank 40 via the sludge return path 6 at a flow rate 3Q, the MLSS concentration in the anoxic tank 40 is 6000 mg/L, compared with the MLSS concentration of 8000 mg/L in the aerobic tank 50.

In the second operation mode, as shown in FIG. 5B, the post-sedimentation water with a flow rate of 4.2Q (which is higher than the flow rate of organic wastewater of 2Q in the first operation mode) is fed into the anoxic tank 40, and the sludge, which has overflowed from the anoxic tank 40 into the dual-use tank 20 and has been treated with the initial absorption process, is sent to the sedimentation tank 70 at a flow rate of 2Q, and after the sedimentation process, the treated water with a flow rate of 1.8Q is sent to the disinfection tank 90, while the sludge with a flow rate of 0.2Q is returned to the aerobic tank 50 from the sedimentation tank 70.

Then, the sludge with a flow rate of 1.0 Q is returned from the aerobic tank 50 to the anoxic tank 40, while the treated water with a flow rate of 2.4 Q is withdrawn from the membrane separation device 60 of the aerobic tank 50. Thus, as a total, the treated water with a flow rate of 4.2 Q is discharged into a river or the like. At this time, with respect to the MLSS concentration 1500 mg/L in the dual-use tank 20, the MLSS concentration in the anoxic tank 40 is 1500 mg/L, and the MLSS concentration in the aerobic tank 50 is about 1200 mg/L.

Figure 6A:
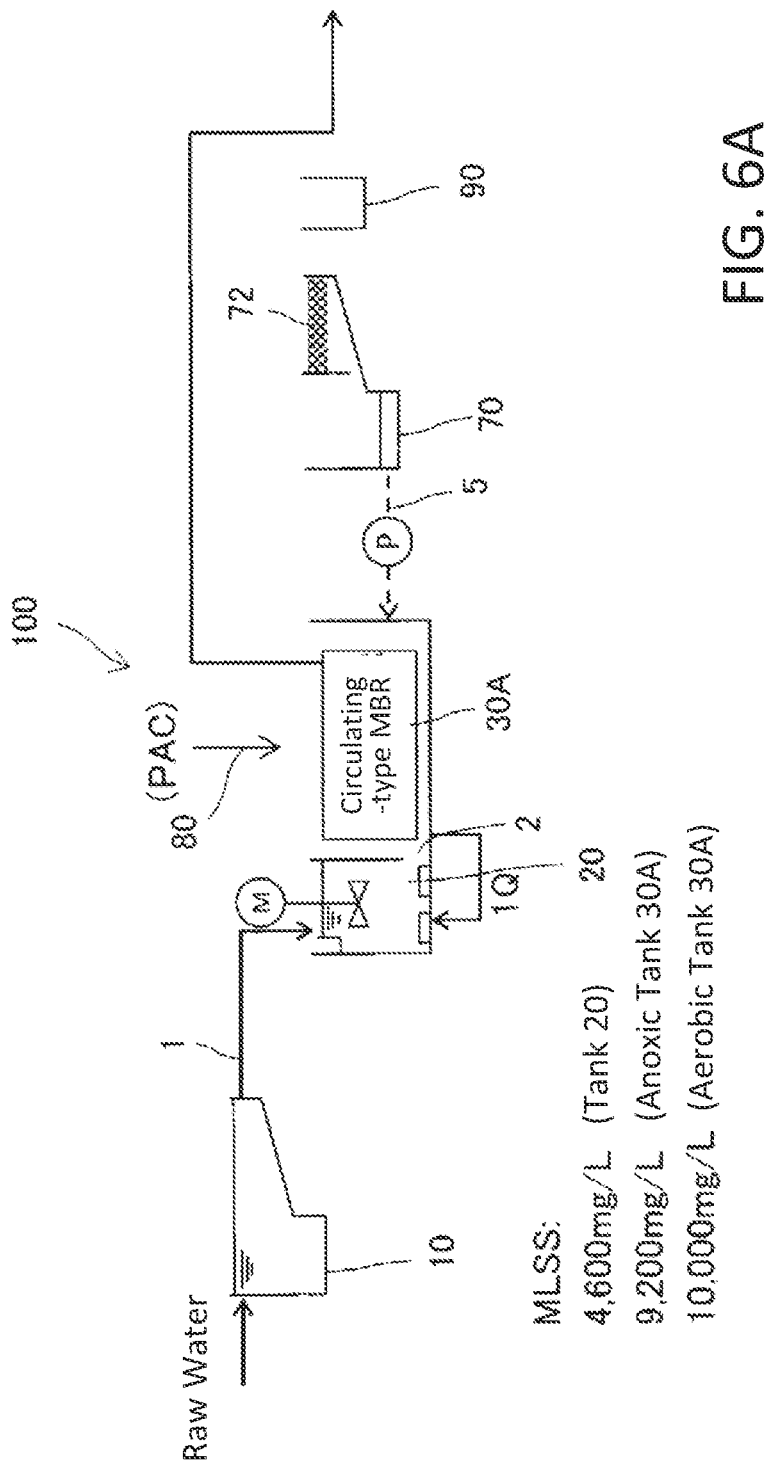
FIG. 6A is a diagram illustrating the second operation mode in the method for operating the organic wastewater treatment apparatus in accordance with yet another embodiment.
Figure 6B:
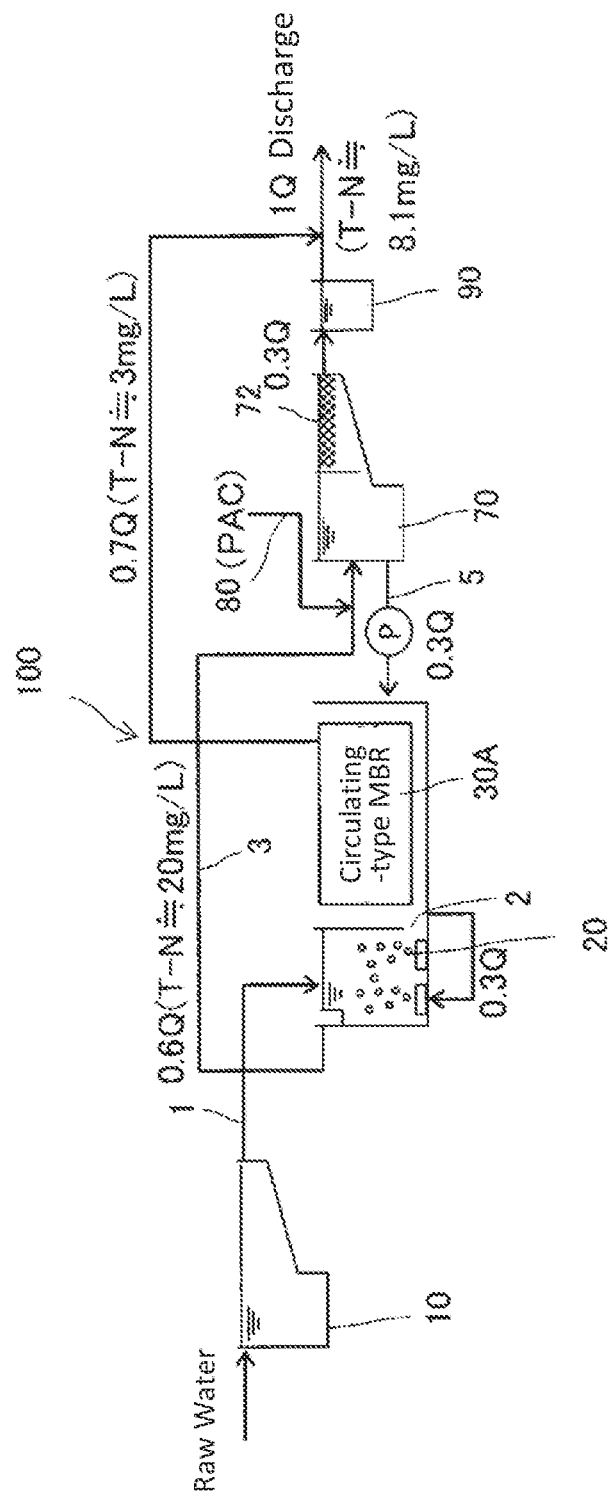
FIG. 6B is a diagram illustrating the second operation mode in the method for operating the organic wastewater treatment apparatus in accordance with yet another embodiment.
Figure 7:
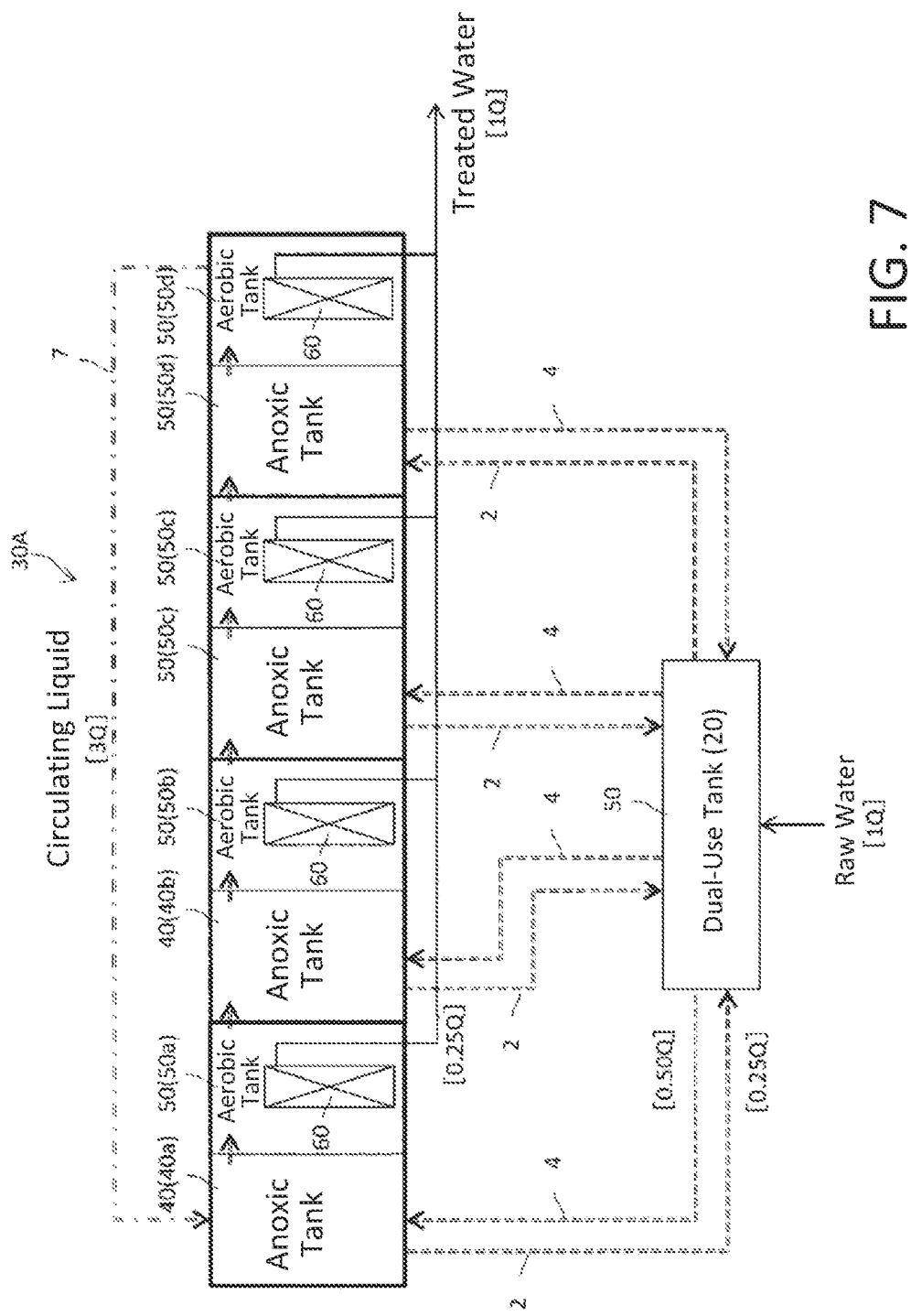
FIG. 7 is a diagram illustrating a circulating-type MBR.
Figure 8:
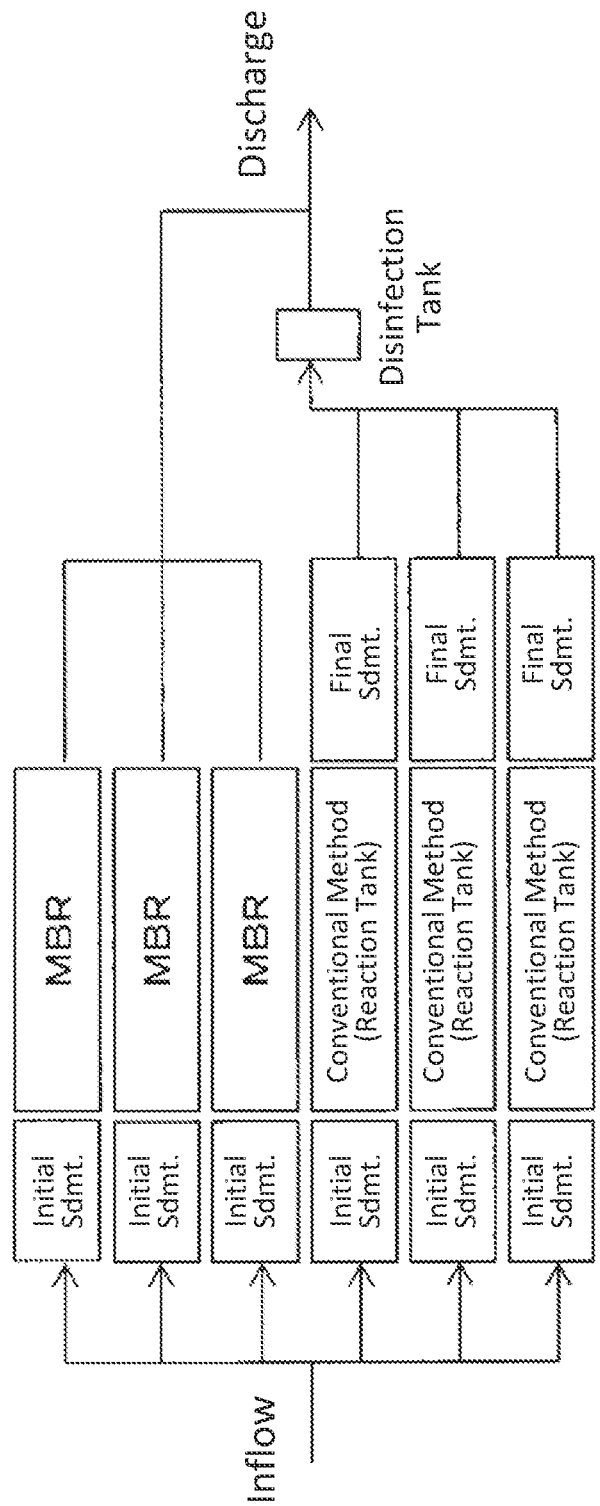
FIG. 8 is a diagram schematically illustrating a method for operating a conventional organic wastewater treatment facility.

FIGS. 6A and 6B show an example in which the membrane bioreactor treatment tank 30 in FIGS. 1A and 1B is replaced with a circulating-type MBR. FIG. 7 shows an example of the circulating-type MBR in which the dual-use tank 20 functions as an anaerobic tank in the first operation mode.

A circulating-type MBR is a biological treatment tank in which a plurality of biological treatment units are connected in series, where each biological treatment unit includes a pair of an anoxic tank 40 located on an upstream side and an aerobic tank 50 located on a downstream side along the flow of organic wastewater, and a membrane separator 60 is immersed in activated sludge in the aerobic tank 50. The MBR is provided with a sludge return path 7 which returns the activated sludge from the aerobic tank 50 disposed at the most downstream side to the anoxic tank 40 disposed on the most upstream side, such that mixture (mixed liquid) of the organic wastewater and the activated sludge circulates through the MBR. Since the organic wastewater is supplied to the anoxic tank 40 formed next to the aerobic tank 50, a high performance of the denitrification process can be achieved under a high BOD concentration in the anoxic tank 40.

As shown in FIG. 6A, by operating the apparatus 100 in the first operation mode during the summer or when the process load is low, the treated water having a very low T-N of about 3 mg/L can be obtained. As shown in FIG. 6B, on the other hand, by operating the apparatus 100 in the second operation mode during the winter or when the process load is high, in which the dual-use tank 20 functions as a nitrification tank, and the treated water obtained through the sedimentation tank 70 and the treated water obtained through the membrane separation device 60 are combined, the generally required treated water quality of T–N<10 mg/L and T–P<0.5 mg/L can be achieved.

In this example, the sedimentation tank 70 is provided with a filtration device 72, such that the water filtered through the filtration device 72 is withdrawn as the treated water in the second operation mode. Accordingly, even in such a case where the MLSS concentration in the sedimentation tank 70 increases, the filtration device 72 can prevent the sludge from flowing into the treated water.

The filtration device 72 may be composed of a filtering material having an apparent specific gravity less than 1, such as foamed polyethylene, foamed polystyrene, foamed polypropylene, and the like, which is formed into minute chips having unevenness of several millimeters, and a net member configured to hold and prevent the floating filter material from flowing out of the sedimentation tank 70. The sludge is caught by the group of minute chips held by the net member, whereby only the treated water is withdrawn from the sedimentation tank 70 and discharged to the disinfection tank 90.

If the regulated T–P value is not so strict, the floating filter material in the sedimentation tank (the final sedimentation basin) 70 can be omitted or replaced with an inclined plate 71 shown in FIG. 6A.

The above-mentioned examples are embodiments of the invention, and the present invention is not limited by the description above, and the specific configurations of each part can be designed and modified as appropriate within the scope of the effect of the invention.

What is claimed is:

1. A method for operating an organic wastewater treatment apparatus including a dual-use tank, a membrane bioreactor treatment tank, and a sedimentation tank, the method comprising:
  operating the organic wastewater treatment apparatus in a first operation mode, including:
    supplying organic wastewater to the dual-use tank and performing an anaerobic treatment process in the dual-use tank;
    then performing a nitrification-denitrification process in the membrane bioreactor treatment tank on the organic wastewater from the anaerobic treatment process; and
    extracting membrane-permeated water from a membrane separation device arranged in the membrane bioreactor treatment tank as treated water; and
  operating the organic wastewater treatment apparatus in a second operation mode, including:
    supplying the organic wastewater to the dual-use tank and performing an aerobic treatment process in the dual-use tank;

then supplying mixed liquid from the dual-use tank to the membrane bioreactor treatment tank and the sedimentation tank, the mixed liquid containing activated sludge;

then performing a nitrification-denitrification process in the membrane bioreactor treatment tank on the mixed liquid from the aerobic treatment process and extracting membrane-permeated water from the membrane separation device arranged in the membrane bioreactor treatment tank as treated water while extracting solid-liquid separated liquid from the sedimentation tank as treated water.

2. The method for operating the organic wastewater treatment apparatus according to claim 1, wherein the operating the organic wastewater treatment apparatus in the second operation mode further includes: returning the mixed liquid from the membrane bioreactor treatment tank to the dual-use tank.

3. The method for operating the organic wastewater treatment apparatus according to claim 1, wherein the operating the organic wastewater treatment apparatus in the second operation mode further includes:

returning the mixed liquid from the sedimentation tank to the membrane bioreactor treatment tank.

4. The method for operating the organic wastewater treatment apparatus according to claim 1, wherein the operating the organic wastewater treatment apparatus in the second operation mode further includes:

dividing and supplying the organic wastewater to the membrane bioreactor treatment tank and the dual-use tank.

5. The method for operating the organic wastewater treatment apparatus according to claim 1, wherein the operating the organic wastewater treatment apparatus in the second operation mode further includes:

controlling an amount of the treated water withdrawn from the membrane bioreactor treatment tank and an amount of the treated water withdrawn from the sedimentation tank according to a position of a sludge interface in the sedimentation tank or quality of the treated water.

6. The method for operating the organic wastewater treatment apparatus according to claim 1, wherein the sedimentation tank is provided with a filtration device, such that filtered water that has passed through the filtration device is withdrawn as the treated water in the second operation mode.

7. The method for operating the organic wastewater treatment apparatus according to claim 1, wherein the operating the organic wastewater treatment apparatus in the first operation mode further comprises:

adding a flocculant to the membrane bioreactor treatment tank, and wherein the operating the organic wastewater treatment apparatus in the second operation mode further comprises:

adding a flocculant to the sedimentation tank or a flow inlet of the sedimentation tank.

8. The method for operating the organic wastewater treatment apparatus according to claim 7, further comprising:

switching between the first operation mode and the second operation mode depending on any of the following indicators: a flow rate of the organic wastewater, a COD load, a $NH_4$—N load, a transmembrane pressure difference, and a water temperature.

9. The method for operating the organic wastewater treatment apparatus according to claim 1, further comprising:

performing a cleaning process to clean the sedimentation tank after switching from the second operation mode to the first operation mode.

* * * * *